United States Patent
Grafmuller

[15] 3,640,021
[45] Feb. 8, 1972

[54] METHOD FOR THE CONSOLIDATION OF SOIL

[72] Inventor: Fritz Grafmuller, Frankfurt am Main, Germany

[73] Assignee: Farbwerke Hoechst Aktiengesellschaft vormals Meister Lucius & Bruning, Frankfurt am Main, Germany

[22] Filed: Aug. 15, 1969

[21] Appl. No.: 850,635

[30] Foreign Application Priority Data

Aug. 31, 1968 Germany..................P 17 92 422.0

[52] U.S. Cl..................................................47/9, 260/30.6
[51] Int. Cl...........................................................A01g 7/00
[58] Field of Search..................................47/9, 58; 260/30.6

[56] References Cited

UNITED STATES PATENTS

| | | | |
|---|---|---|---|
| 2,961,799 | 11/1960 | Coe | 47/9 |
| 3,077,054 | 2/1963 | Niemeijer | 47/9 |
| 3,164,925 | 1/1965 | Harshman et al. | 47/9 |
| 3,174,942 | 3/1965 | Erikson et al. | 47/9 X |
| 3,261,127 | 7/1966 | Ferm et al. | 47/58 |
| 3,319,377 | 5/1967 | Tapas et al. | 47/9 |
| 3,464,156 | 9/1969 | Rogers et al. | 47/58 |

FOREIGN PATENTS OR APPLICATIONS 212,372  1/1958  Australia..................................47/9

*Primary Examiner*—Robert E. Bagwill
*Attorney*—Curtis, Morris & Safford

[57] ABSTRACT

For the protection against erosion the surface of soil is sprayed with an aqueous plastics dispersion containing water insoluble polymeric substances of natural or synthetic origin and water-soluble phosphates whereby a coherent crust is formed. The addition of phosphates enables dispersions having a content of polymeric substance of 20 to 70 percent to be used.

9 Claims, No Drawings

METHOD FOR THE CONSOLIDATION OF SOIL

The present invention relates to a method for the consolidation of soil to control erosion, especially of cultivable soil.

It is has been proposed to use aqueous dispersions of water insoluble natural or synthetic highly polymeric substances to consolidate soils where erosion is liable to occur. The protection of the land against wind and rain erosion is very important. It serves not only to preserve cultivable land but also to recultivate land damaged by erosion, for example waste land and deserts.

The known processes to consolidate soil with polymer containing dispersions have the important drawback that the dispersions must be used in a relatively diluted form to ensure a sufficient distribution and crust formation on the surface of the soil to be protected. In most known processes dispersions containing 2 to 10 percent of solid polymer are used. When more concentrated dispersions are applied, for example preparations of 20 to 70 percent strength, adhering and coherent crusts do not form on the soil to be protected when the usual amounts are applied, for example 5 to 50 grams of solid per square meter of soil, so that the desired protection is not ensured.

To apply per square meter of soil 20 grams of solid in the form of a 5 percent dispersion, about 4,000 liters of liquid are required per hectare. As compared therewith a 50 percent dispersion would require for the same area about 400 liters of liquid only. This fact is of decisive importance when large areas are to be treated, for example in agriculture, on industrial areas and deserts. In these cases the use of erosion inhibiting agents ("soil stabilizers") becomes economic only if the said agents can be applied with large area spraying devices as generally used for the application of plant protecting agents, for example beam sprayers of large range of operation (for example up to 25 meters) on motor cars, airplanes or helicopters. When smaller areas are to be treated, knapsack sprayers are sufficient, The spraying devices used for plant protection are provided with tanks which generally have a capacity to apply about 400 to 600 liters of spray liquor per hectare. Hence, it follows that when about 4,000 liters of liquid (dispersion) are to be applied per hectare, about 10 times the tank capacity or tank fillings are required and the applications must be repeated several times in order to apply the required amount of polymer. For the reasons set forth above it is very important and desirable from a technical point of view to find a method for applying highly concentrated plastics dispersions to control erosion of soil.

It has now been found, that soil can be consolidated in an especially advantageous manner by applying to the soil dispersions containing water-soluble phosphates, in addition to water insoluble polymeric substances of natural synthetic origin. The proportion of water soluble phosphates amounts to 0.2 to 10 percent by weight, calculated on the finished dispersion, preferably 1 to 4 percent by weight. The best results are obtained with a phosphate content of 2 to 3 percent by weight. With the aid of the said phosphate containing dispersions it is possible to apply to the soil highly concentrated dispersions, for example dispersions having a plastics content of 20 to 70 percent by weight.

Sandy and loamy soils have an excellent absorption capacity for the dispersions of the invention with formation of coherent, firmly adhering crusts which are resistant to rain and weather. The crusts ensure a very good protection against wind and water erosion and when the dispersions are applied in the amounts specified above, the crusts are microporous and encourage the growth of plants.

Suitable phosphates are water soluble alkali metal and ammonium salts of condensed phosphates, preferably chain-shaped polyphosphates, for example sodium tripolyphosphate, sodium hexametaphosphate (Graham's salt), sodium oligophosphates and tetrapotassium pyrophosphate. The average degree of polymerization of the polyphosphates used may vary in the range of from 2 to several hundred. Especially good results are obtained with hexametaphosphates, oligophosphates and tripolyphosphates. First of all the use of sodium tripolyphosphate and sodium hexametaphosphate is a special mode of execution of the process of the invention. Additions of ionic and/or nonionic tensides in an amount of from 0.1 to 3 percent by weight, calculated on the finished dispersion, may bring about additional advantages.

The dispersions used according to the invention contain 20 to 70 percent by weight of polymer, preferably 20 to 55 percent of polymer nd more preferably 30 to 50 percent of polymer.

Especially suitable are finely dispersed, low viscosity dispersions which are characterized by a good compatibility with electrolytes, for example aqueous dispersions of polyvinyl esters or of vinyl ester copolymers, the latex particles of which have a size of from 0.5 to 5 microns. Besides organic protective colloids, the said dispersions contain salts of inorganic or organic acids (cf. German Pat. No. 1,029,565). In the process of the invention there are preferably used such dispersions as have a low whitening point, for example in the temperature range of from 0° to 10° C., especially 0° to 5°. It is particularly advantageous to use dispersions having a whitening point of from 0° to 1° C., so that they may also be applied during cold periods of the year when the temperature is still above freezing.

It is likewise possible to use in the process of the invention plasticizer-containing dispersions, more particularly dispersions containing a plasticizer which is neither phytotoxic nor inhibits the growth of plants.

In many cases it is advantageous to use dispersions having an adhesive effect. Dispersions of this type can be used to bind organic mulch components, for example straw, cellulose fibers, grass seed and peat.

Mulching layers of foamed material (for example aminoplasts) can also be bonded by the process of the invention so as to be resistant to wind and rain erosion whereby the water retention of the foamed material may be improved.

Stabilized bitumen emulsions having a sufficient stability towards electrolytes may also be used in the process of the invention.

The dispersions to be used according to the invention may contain, as water insoluble polymers, practically any polymer forming a dispersion with water, preferably vinyl polymers. It is likewise possible, of course, to use mixtures of different polymers. There may be used homopolymers as well as copolymers, for example homo- or copolymers of vinyl acetate, vinyl propionate, acrylic acid esters, methacrylic acid esters, acrylonitrile, vinyl chloride, ethylene, styrene, maleic acid esters, as well as of dienes, for example butadiene; copolymers containing a proportion of over 50 percent by weight of butadiene generally having elastomeric properties. The best results are obtained with aqueous dispersions of polyvinyl acetate or copolymers containing vinyl acetate.

Besides the aforesaid synthetic polymers the dispersions to be used in the process of the invention may also contain natural rubber, tall oil products, residual oil of vegetal origin, bitumen or asphalt constituents as well as mineral oil.

The dispersions to be used according to the invention may be dyed light or dark. In this manner the areas which have been stabilized against erosion can be marked. On agricultural land the use of dyestuffs reflecting thermal rays (for example kaolin or titanium dioxide) and above all of dyestuffs absorbing thermal rays is very important. Dispersions containing as black pigment soot or black iron oxide in an amount of from 1 to 20 percent by weight, calculated on the finished dispersion, are especially advantageous. The use of dispersions of this type yields black soils on which, in countries with relatively little periods of insolation, there may be obtained not only a protection against erosion but also the temperature of the soil is increased, for example by 7° to 10° C. so that the solar energy is better utilized, and cultivated plants, for example vegetables, grow within shorter periods of time whereby the harvest is increased. Especially good results are obtained with dispersions containing 10 to 15 percent by weight of soot, calculated on the finished dispersion. According to a special variant of the process of the invention, dispersions containing a proportion of 25 percent by weight of polymer and 10 percent by weight of soot are used. The soot may be added to the dispersion either during its manufacture or preferably directly prior to use by stirring the dispersion with a pigment paste readily dispersible in water.

To modify the film properties of the dispersions to be used, water soluble polymeric compounds, for example polyvinyl alcohol, carboxymethyl cellulose, methyl cellulose, methylhydroxyethyl cellulose, alginates, proteins, vegetable slimes and polymeric carboxylates may be added.

To protect land against erosion the dispersions of the invention are generally applied in an amount of from 5 to 50 grams of water insoluble polymer per square meter whereby microporous crusts are formed. With amounts of about 0.5 kilogram of polymer or more per square meter, stable water impervious layers can be obtained. IN this manner mineral salts or mineral fertilizers can be stored outdoors by covering the stocks with a layer of sand which is sprayed with the necessary amount of dispersion to render it weatherproof.

The most important fields of application of the process of the invention are agricultural areas, sandy coastal areas, deserts, areas around runways on airports, industrial areas and building grounds, slopes of roads, ore and coal stocks as well as waste heaps. The application of the dispersions may be combined with suitable planting and recultivation processes.

The dispersions according to the invention may advantageously contain biocidal agents, especially herbicides, fungicides or insecticides. As herbicides there can be used water soluble as well as water insoluble compounds. As representatives of the latter class there are mentioned 2,4-dichlorophenoxy-acetic acid, carbamates such as isopropyl-N-(m-chlorophenyl)-carbamate, urea derivatives such as N-(3-chloror-4-methoxyphenyl)-N', N'-dimethyl urea, as well as salts of chlorinated organic acids such as trichloroacetic acid, for example sodium trichloroacetate, phenols such as pentachlorophenol, and dinitrocompounds such as 4,6-dinitro-o-cresol. The herbicides are generally used in an amount of from 0.5 to 10 kilograms per hectare.

The dispersions according to the invention may also be prepared directly prior to their application by stirring dry preparations with water, which preparations contain the water insoluble polymeric constituents as well as the soluble compound, for example polyphosphate. Dry preparations can be obtained by simply mixing the pulverulent components; advantageously, however, they are obtained by drying the dispersions according to the invention, for example by spraying or drying on heated rolls.

The phosphate in the dispersions of the invention can act in the soil as fertilizer. The further addition of potassium and ammonium polyphosphates improves the fertilizing effect. It is naturally possible further to add to the dispersion other fertilizers, preferably water soluble products. Especially good results are obtained with urea fertilizers.

The following examples serve to illustrate the invention but they are not intended to limit thereto, the percentages are by weight unless otherwise stated.

EXAMPLE 1

Fine limy sand of dunes on which flower bulbs are cultivated (for example tulips, hyacinths and narcisses) was sprayed with a 40 aqueous plastics dispersion containing 3 percent of sodium tripolyphosphate. The dispersed plastic was a copolymer of 90 percent of vinyl acetate and 10 percent of ethylene. The amount applied was 400 liters of dispersion per hectare. Directly after spraying and drying, a coherent, firmly adhering and microporous crust was obtained which was resistant to rain and atmospheric influences and ensured a very good protection against erosion by wind and rain. The crust was not phytotoxic and neither inhibited the growth of the plants nor affected the water balance of the soil. The protection was still fully effective after 5 months.

EXAMPLE 2

Fine limy sand on which carrots are cultivated was sprayed with an aqueous dispersion containing 25 percent of plastics material, 10 percent of carbon black and 2 percent of sodium hexametaphosphate. The plastics material used was a copolymer of 90 percent by weight of vinyl acetate and 10 percent by weight of ethylene. 600 Liters of dispersion were applied per hectare. On drying the dispersion on the soil, a greyish black, coherent and firmly adhering crust was obtained. The crust was microporous, resistant to rain and atmospheric influences, and ensured a very good protection against erosion by wind and rain, it was not phytotoxic and did not inhibit the growing of the carrots and the water balance of the soil. On the contrary, the growing of the plants was favored.

When applied in spring in countries with relatively little insolation, the temperature of the soil in the surface layer was 7° to 10° C. higher during sunshine than that of an untreated sandy soil, whereby the vegetation period was shortened and the harvest was at least one week earlier.

The use of a dispersion containing black iron oxide instead of carbon black gave an analogous result.

EXAMPLE 3

Fine sand of dunes of an industrial area should be permanently protected against erosion. Mineral fertilizer was first scattered, then barley and a mixture of grass seed were sown and the surface of the soil was slightly rolled. As temporary protection against erosion until a coherent vegetation had grown, the sown surface was sprayed with a 40 percent aqueous polyvinyl acetate dispersion containing 4 percent of sodium tripolyphosphate. The amount applied was 400 liters of dispersion per hectare. The result obtained was analogous to that of Example 1.

EXAMPLE 4

A mulching layer of flakes of a foamed material with open pores (hardened aminoplast foam) which had been applied by the hydrosowing process in admixture with fertilizer and grass seed to an industrial area was to be protected against erosion. For this purpose the surface of the foamed material was sprayed with a 40 percent aqueous dispersion of a copolymer of 70 percent of vinyl acetate and 30 percent of butyl acrylate, which dispersion contained 2 percent of sodium tripolyphosphate. Four hundred liters of dispersion were applied per hectare. After drying of the dispersion a microporous, erosionproof bonding of the foamed layer was obtained. The bonding was resistant to rain and weather and the water retention of the layer was improved without the function of the mulching being affected.

EXAMPLE 5

A mulching layer of chopped straw of wheat, which had been applied to a gravel slope together with mineral fertilizer and grass seed, was bonded so as to be resistant to erosion by wind and rain by spraying the layer with a 30 percent aqueous dispersion of plastics material containing 2 percent of a mixture of equal parts of sodium tripolyphosphate and sodium hexametaphosphate. The dispersed plastics material had the properties of an adhesive and was a copolymer of 40 percent of vinyl acetate, 40 percent of dioctyl maleate and 20 percent of ethyl-hexyl acrylate. 500 liters of dispersion were applied per hectare. The bonding of the mulching layer was very effective and solid, which was very favorable to the growth of the grass without any disadvantages being observed.

EXAMPLE 6

Agricultural land of light sandy soil where drifts are liable to occur and on which carrots had been sown, was protected against erosion by wind and simultaneously treated with a soil herbicide by spraying with a 32 percent aqueous plastics dispersion containing 2.5 percent of sodium tripolyphosphate and 0.6 percent of N-(3-chloro-4-methoxphenyl)-N',N'-dimethyl urea as herbicide. The dispersed plastics material was a copolymer of 90 percent of vinyl acetate and 10 percent of ethylene. Five hundred liters of dispersion were applied per hectare. The protection against erosion by wind was excellent and the herbicide developed its full effect.

What is claimed is:

1. In a method for the consolidation of soil against erosion, by applying to the surface of the soil a dispersion of a homo- or copolymeric vinyl compound, the improvement which comprises using an aqueous dispersion which contains, in addition to said vinyl compound, 0.2 to 10 percent by weight of a water-soluble phosphate.

2. The method of claim 1, wherein dispersions containing 20 to 70 percent by weight of vinyl material are used.

3. The method of claim 1, wherein the dispersion polymers contain a plasticizer.

4. The method of claim 1, wherein the phosphate is a water-soluble alkali metal or ammonium salt of a condensed phosphate.

5. The method of claim 1, wherein the phosphate is a water-soluble alkali metal or ammonium salt of a chain-shaped polyphosphate.

6. The method of claim 1, wherein the dispersion used contains additionally an ionic or nonionic surface active substance in an amount of from 0.1 to 3 percent by weight, calculated on the finished dispersion.

7. The method of claim 1, wherein the dispersion used contains additionally an ionic and a nonionic surface active substance in an amount of from 0.1 to 3 percent by weight, calculated on the finished dispersion.

8. The method of claim 1, wherein the dispersion is used in combination with a dyestuff or a biocidal agent.

9. The method of claim 1, wherein the dispersion is used in combination with a dyestuff and a biocidal agent.

* * * * *